United States Patent
Xue et al.

(10) Patent No.: US 12,516,285 B2
(45) Date of Patent: Jan. 6, 2026

(54) SMALL PEPTIDE MIPEP166I AND USE THEREOF IN PLANT TISSUE CULTURE

(71) Applicant: Nanjing Forestry University, Jiangsu (CN)

(72) Inventors: Liangjiao Xue, Jiangsu (CN); Ying Guo, Jiangsu (CN); Fangfang Fu, Jiangsu (CN); Ganggui Yang, Jiangsu (CN); Yongli Qi, Jiangsu (CN); Guibin Wang, Jiangsu (CN); Fuliang Cao, Jiangsu (CN)

(73) Assignee: Nanjing Forestry University, Jiangsu (CN)

( * ) Notice: Subject to any disclaimer, the term of this patent is extended or adjusted under 35 U.S.C. 154(b) by 102 days.

(21) Appl. No.: 18/945,636

(22) Filed: Nov. 13, 2024

(65) Prior Publication Data

US 2025/0171737 A1    May 29, 2025

(30) Foreign Application Priority Data

Nov. 24, 2023   (CN) .......................... 202311578307.5

(51) Int. Cl.
*C12N 5/04*    (2006.01)

(52) U.S. Cl.
CPC .......... *C12N 5/04* (2013.01); *C12N 2501/998* (2013.01)

(58) Field of Classification Search
CPC ............................. C12N 2501/998; C12N 5/04
See application file for complete search history.

(56) References Cited

U.S. PATENT DOCUMENTS

| | | |
|---|---|---|
| 2006/0236427 A1 | 10/2006 | Chiang et al. |
| 2011/0054012 A1 | 3/2011 | Place et al. |
| 2012/0297504 A1 | 11/2012 | Granevitze et al. |
| 2013/0042372 A1 | 2/2013 | Meilan et al. |
| 2017/0211080 A1 | 7/2017 | Combier et al. |

FOREIGN PATENT DOCUMENTS

| | | | |
|---|---|---|---|
| CN | 105874083 | A | 8/2016 |
| CN | 106459921 | A | 2/2017 |
| CN | 110777153 | A | 2/2020 |
| CN | 112251526 | A | 1/2021 |
| CN | 112301029 | A | 2/2021 |
| CN | 113430295 | A | 9/2021 |
| CN | 116286949 | A | 6/2023 |
| FR | 3021503 | A1 | 12/2015 |
| WO | 2013181052 | A1 | 12/2013 |
| WO | 2016108750 | A1 | 7/2016 |

OTHER PUBLICATIONS

Qiu et al (The genome of Populus alba x Populus tremula var. glandulosa clone 84K. DNA Research, 26(5), 423-431, 2019). (Year: 2019).*
Guo et al (A genome-wide identification of miPEPs in hybrid poplar reveals regulatory functions of miPEP166i in adventitious root elongation. Industrial Crops & Products. Available online Feb. 7, 2024). (Year: 2024).*
Xu et al (Application of Developmental Regulators for Enhancing Plant Regeneration and Genetic Transformation. Plants, p. 1-27, 2024). (Year: 2024).*
Chen et al (A miRNA-Encoded Small Peptide, vvi-miPEP171d1, Regulates Adventitious Root Formation. Plant Physiology_, Jun. 2020, vol. 183, pp. 656-670). (Year: 2020).*
Wei Bo et al.,Progress in Plant Small RNA Research via High-Throughput Sequencing,Scientia Agricultura Sinica,2009,42(11):3755-3764.
Hu Yuanyan, Qiu Lijuan, Yan Zhe, Advances of plant miRNA—encoded small peptides (miPEP) [J], Soils and Crops, 2022, 11(2):192-199.
GenBank, MCH8304069.1:MAG: hypothetical proteinIIB94_02940 [Candidatus Marinimicrobia bacterium], GenBank, Mar. 14, 2022.
Chen, Qiu-ju; Deng, Bo-han; Gao, Jie; Zhao, Zhong-yang; Chen, Zi-li; Song, Shi-ren; Wang, Lei; Zhao, Li-ping; Xu, Wen-ping; Zhang, Cai-xi; Ma, Chao; Wang, Shi-ping . (2020). An miRNA-encoded small peptide, vvi-miPEP171d1, regulates adventitious root formation. Plant Physiology, (), pp. 00197.2020-. doi: 10.1104/pp.20.00197.
Zhang Yue etal., Prediction of the MicroRNAs and Their Targets in Tea Plant (*Camellia sinensis* L.) Based on EST and GSS Sequences, Chinese Journal of Tropical Crops, 2018, 39(10):1999-2006.
GenBank,XR_002977039.2: Predicted: Populus trichocarpa uncharacterized LOC112323594 (LOC112323594), transcript variant X2, ncRNA, GenBank,Dec. 8, 2022.
Tatiana N Erokhina et al., Regulatory miPEP Open Reading Frames Contained in the Primary Transcripts of microRNAs, International Journal of Molecular Sciences, 24(03), Jan. 20, 2023.

* cited by examiner

*Primary Examiner* — Wayne Zhong
(74) *Attorney, Agent, or Firm* — Rondaus PLLC; George Liu (57) ABSTRACT

Disclosed are a small peptide miPEP166i and use thereof in plant tissue culture, which relates to the technical field of plant genetic engineering. Through a comprehensive peptidomics workflow, the present disclosure systematically identifies miPEPs in three tissues of 84K poplar. By further translating the sequence within the primary transcript of identified miRNA166i, a root-specifically expressed small peptide, miPEP166i, is obtained. The amino acid sequence of the miPEP166i is as shown in SEQ ID NO.3. Upon verification, exogenous use of synthetically produced miPEP166i promotes the formation and elongation of adventitious roots in 84K poplar. The comprehensive annotation and functional analysis of miPEPs in 84K poplar presented in the present disclosure provide valuable genetic resources for their use in poplar and other forest trees.

5 Claims, 5 Drawing Sheets
Specification includes a Sequence Listing.

SEQUENCE LISTING

```
Sequence total quantity: 3
SEQ ID NO: 1                moltype = RNA   length = 21
FEATURE                     Location/Qualifiers
source                      1..21
                            mol_type = genomic RNA
                            organism = Populus alba x Populus tremula var. glandulosa
SEQUENCE: 1
tcggaccagg cttcattccc c                                                 21

SEQ ID NO: 2                moltype = DNA   length = 1122
FEATURE                     Location/Qualifiers
source                      1..1122
                            mol_type = genomic DNA
                            organism = Populus alba x Populus tremula var. glandulosa
SEQUENCE: 2
ctgtgaatct gaatcatggt acagaacatg acttcacagg cagacttgaa cattcttata      60
cttttatttt taatgtactc tttttatttc cttaaagaat atatgtgtgt ttgatcagtc     120
atgatggccg aatccaaggg tagaagttga gaggaaactg ttggcaaata tattcttatt     180
gtgttgttgt aattattcaa gaggcacgga caaaagagag aaatgaccac gactcatgga     240
cggccagacc ccatgttctc ttccttctct ctcatttggg cccctttttc tttccaataa     300
aactaaatga ttatccttat catcatcatg tttgttgttt tgtccatggt atttagcaca     360
aaaccccttat tcgcttcctt ctgttccatc cccttataac accacatagc tggctgcatt     420
gagcactcct tcatggtcaa gaaaagagag aagcttgcca agaaattgca agatggtagc     480
tagctgcttg ctagttagaa aggaagcttg tcttttgagg ggaatgttgt ttggttcaag     540
gcctggccaa cctatgtttt ggaatttaaa atatcatgtc ctcggaccag gcttcattcc     600
cctcaattac tgcttctaaa tatgcatgat cagatcgttt tggatcaact tcgagatatg     660
gaggtgacga tttttttttc ttttttttata cggtttccct ttgcttttta tcagcttttt     720
ttctttggtt gatgaattcc atgttataga taaatttcac atggatcaag gttgttgact     780
gttggtggga gaaccactg gtggtggctt tgaaacactc agaggggata aaacacactg     840
ttttattaca caaaccgaa gcttacaata acttaacaaa agcttataca cgccctctct     900
ctcttctttc tctttcaagt gttcctctca attctctcca cacatataac ataactgagc     960
atcctattta tacataaatt cagaatacga aaatctactg ttccaggtgt gaaggcggct    1020
gttgaccggc ggtgtgaagg cggctggcgg ctgcggctgg tggctggcgg ctggtcggtg    1080
gtcggtggct ggtggctggt tgccttcctt gactggaaac tt                       1122

SEQ ID NO: 3                moltype = AA    length = 24
FEATURE                     Location/Qualifiers
source                      1..24
                            mol_type = protein
                            organism = Populus alba x Populus tremula var. glandulosa
SEQUENCE: 3
MDGQTPCSLP SLSFGPLFLS NKTK                                              24
```

SMALL PEPTIDE MIPEP166I AND USE THEREOF IN PLANT TISSUE CULTURE

INCORPORATION BY REFERENCE

The instant application contains a Sequence Listing which has been submitted in XML format. Said XML copy is named SMALL PEPTIDE miPEP166i AND USE THEREOF IN PLANT TISSUE CULTURE.xml, created on Jul. 11, 2024, and is 5,009 bytes in size.

TECHNICAL FIELD

The present disclosure relates to the technical field of plant genetic engineering, and specifically relates to a small peptide miPEP166i and use thereof in plant tissue culture.

BACKGROUND

Peptides are small biological molecules within the proteome of plants. Since the first report of signaling peptides in plants in 1991, hundreds of short peptides (sPEPs, 2-100 amino acid residues) encoded by small open reading frames (sORFs) have been identified, which are involved in plant growth and development, signal transduction, biotic responses, and abiotic responses. However, compared to proteins encoded by classical genes, the diversity and functions of sPEPs remain relatively unclear.

Recently, advancements in mass spectrometry technology, coupled with the development of various bioinformatics tools, have facilitated the identification of sPEPs across the whole genome in some model plants, such as Arabidopsis, maize, and grape. These studies have shown that approximately 44.04-91.20% of sPEPs are encoded by sORFs located in "non-coding" regions, such as intergenic and intronic DNA, non-coding RNAs, and pseudogenes. When randomly selected sORFs were overexpressed in Arabidopsis, about 10% (49/473) of the encoding sORFs induced visible phenotypic effects, which is seven times higher than that of randomly selected known genes. sPEPs can also be generated from transcripts of microRNA loci, which are termed microRNA-encoded peptides (miPEPs), and have received considerable attention due to their crucial functions in improving agronomic traits.

MicroRNAs (miRNAs) are endogenous, small, non-coding RNAs that regulate gene expression at the post-transcriptional level by cleaving target mRNAs. Mature miRNAs are processed products of their primary transcripts (pri-miRNAs), and pri-miRNAs have the potential to encode miPEPs. MiPEPs physically interact with their ORFs and positively regulate the accumulation of the associated miRNAs. Most conserved miRNAs play crucial roles in plant growth, development, and stress responses; therefore, miPEPs are strong candidates as biomolecular tools for manipulating plant phenotypes. For example, it has been reported that miPEP172c in soybean, miPEP858a in Arabidopsis, and miPEP164c in grape regulate nodulation, root growth, and anthocyanin accumulation, respectively. Exogenous use of miPEPs can not only avoid the technical challenges and governmental regulations associated with transgenic processes but also minimize environmental pollution due to their high biodegradability. However, miPEPs have not been identified on a large scale in most higher plants, and their functions require in-depth exploration, especially in forest trees.

As a woody model plant, *Populus* species possess abundant publicly available genomic resources that can be utilized for functional genomics research. Furthermore, the identification, origin, evolution, and biological functions of miRNAs in *Populus* have been extensively studied. For instance, miR165/166 can control the balanced differentiation between secondary xylem and phloem tissues during secondary growth in *Populus trichocarpa* by inhibiting the expression of PtrHB7 in a dose-dependent manner; miR167a can improve lateral root development in hybrid poplar (*P. deltoides×P. euramericana*) by repressing its target transcript (PeARF). The functional diversity of miRNAs in *Populus* provides the potential to interfere with poplar development and growth through the application of miPEPs.

SUMMARY

The object of the present disclosure is to provide a small peptide miPEP166i and use thereof in plant tissue culture, aiming to offer valuable genetic resources for its use in forest trees such as poplar by investigating the biological functions and potential regulatory mechanisms of miPEP166i.

The present disclosure achieves the above objects through the following technical solutions:

The first object of the present disclosure is to provide a small peptide miPEP166i, wherein an amino acid sequence of the small peptide miPEP166i is as shown in SEQ ID NO.3.

Further improvement is that the small peptide miPEP166i is obtained by translating from the 236th to the 307th position of a primary transcript sequence of miRNA166i, and the primary transcript sequence of the miRNA166i is as shown in SEQ ID NO.2.

The second object of the present disclosure is to further provide a use of the small peptide miPEP166i as described in any one of the above in plant tissue culture.

Further improvement is that the plant is 84K poplar.

Further improvement is that the use specifically involves exogenously adding miPEP166i to a growth medium during the tissue culture of 84K poplar to promote the formation and elongation of adventitious roots in 84K poplar.

Further improvement is that an addition concentration of the miPEP166i is 5 µM.

Further improvement is that the miPEP166i promotes the formation and elongation of adventitious roots in 84K poplar by enhancing the expression of miR166i or reducing the expression of target genes of miR166i.

Further improvement is that the target genes of the miR166i include PagHB8 and PagREV.

The present disclosure has the following beneficial effects:

Through a comprehensive peptidomics workflow, the present disclosure systematically identifies miPEPs within three tissues of 84K poplar and further translates the sequence found within the primary transcript of miRNA166i to obtain the root-specifically expressed miPEP166i. Upon verification, exogenous use of miPEP166i promotes the formation and elongation of adventitious roots in 84K poplar in a sequence-specific manner. The comprehensive annotation and functional analysis of miPEPs in 84K poplar presented in the present disclosure provide valuable genetic resources for their use in poplar and other forest trees.

DETAILED DESCRIPTION OF THE EMBODIMENTS

The present disclosure will be further described in detail below with reference to the accompanying drawings, and it is necessary to note that the following specific embodiments are only used to further describe the present disclosure, and cannot be understood as a limitation to the protection scope of the present disclosure, and a person skilled in the art may make some non-essential improvements and adjustments to the present disclosure according to the foregoing application content.

1. Materials and Reagents

In this embodiment, unless otherwise specified, all experimental methods can be performed according to conventional protocols, and all materials and reagents used, unless specifically noted, are commercially available.

2. Methods

Figure 1A:
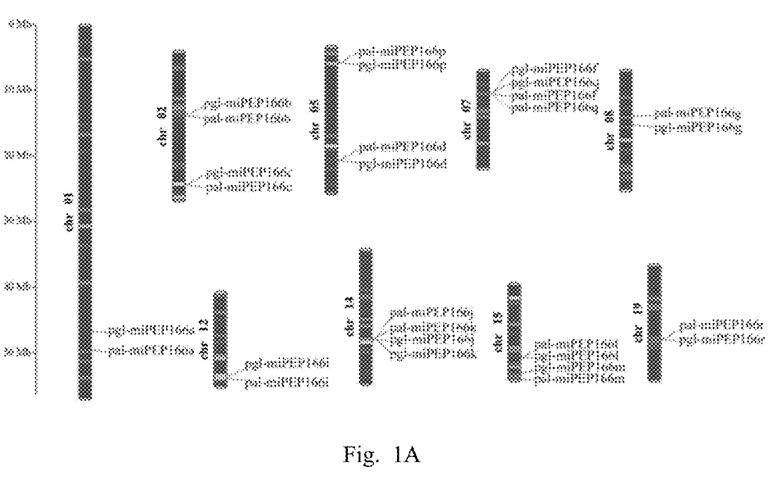
FIG. 1A shows the positions of miPEPs encoded by identified MIR166 family members on the chromosomes of 84K poplar.

For *Populus alba*×*Populus tremula* var. glandulosa (84K poplar), we identified 15 members of the MIR165/166 family in the subgenomes of *Populus alba* and *Populus glandulosa* (introduced by the Chinese Academy of Forestry). These members are highly conserved across plant species. The MIR166 family members collectively produce 73 miPEPs, among which Pal-miR166i from *Populus alba* contains the highest number of six ORFs encoding miPEPs (FIG. 1A).

2.1 Identification of miRNA166i

Leaf samples were randomly collected from 40-day-old seedlings for small RNA sequencing, with three biological replicates. The TruSeq Small RNA Sample Prep Kit (Illumina, San Diego, USA) was used to construct small RNA libraries, which were then sequenced into 50-bp single-end reads using the Illumina Hiseq2000/2500 platform. Publicly available sRNA datasets for 84K poplar, including samples from xylem (SRR10483424), phloem (SRR1483425), and leaves (SRR10481426), were downloaded from the NCBI SRA database.

Based on previous descriptions, miRNA loci in the 84K poplar genome were annotated by integrating de novo and homology-based methods. Cutadapt (version 2.10) was used to remove 3' adapters from the raw 18-33 nt reads and process the reads accordingly. Bowtie (version 1.3.0) software was employed to remove known non-coding RNAs (rRNA, tRNA, snRNA, scRNA, and snoRNA) by mapping the trimmed reads to the Rfam database (version 11.0). The processed sRNA reads were further mapped to the 84K poplar reference genome (https://db.cngb.org/search/project/CNP0000339/) and ShortStack software (version 3.3.3) was applied for miRNA identification. In the homology-based miRNA identification method, known miRNA sequences from *P. deltoides, P. euphratica, P. tremula,* and *P. trichocarpa* were mapped to the 84K poplar reference genome using Bowtie software. Genomic sequences from alignment regions with fewer than 2 mismatches were extracted and applied to ShortStack software. The sequence of miRNA166i is shown in SEQ ID NO.1.

2.2. Obtaining miPEP166i

The identified miRNA166i was amplified to obtain its primary transcript sequence, pri-miRNA166i, as shown in SEQ ID NO.2. The pri-miRNA166i sequence was translated, and miPEP166i was identified through LC-MS/MS peptidomics. The amino acid sequence of miPEP166i is shown in SEQ ID NO.3.

2.3. Specific Regulatory Function of miPEP166i

Figure 1B:
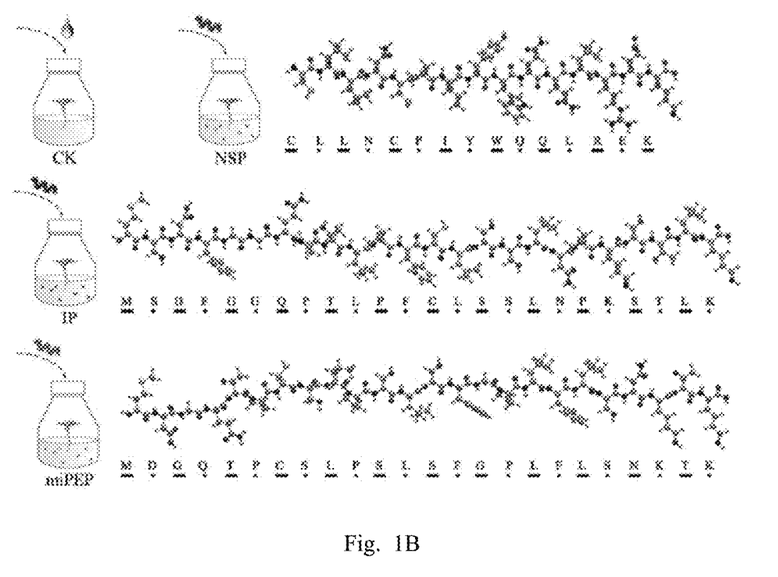
FIG. 1B illustrates the original structures of three synthetic peptides and a schematic of exogenous treatment (NSP, non-specific peptide (SEQ ID NO.4); IP, interfering peptide (SEQ ID NO.5); miPEP, peptide encoded by pri-miRNA166i (SEQ ID NO.3); CK, control group without treatment)).

To characterize the specific regulatory function of miPEP166i, based on the peptide amino acid sequence structure, Sangon Biotech (Shanghai) Co., Ltd. was commissioned to synthesize an additional non-specific peptide (NSP) consisting of 15 amino acids and an interference peptide (IP) with the same amino acids but a different sequence as controls (FIG. 1B);

The sequence of the non-specific peptide (NSP) is CLLNCPIYWQQLREX (SEQ ID NO.4);

The sequence of the interference peptide (IP) is MSDFGGQPTLPFCLSSLNPKSTLK (SEQ ID NO.5).

The three synthetic peptides were each added to MS medium at a concentration of 5 µM as exogenous treatments, while sterile water was chosen as the blank control (CK) treatment (FIG. 1B).

Figure 2A:
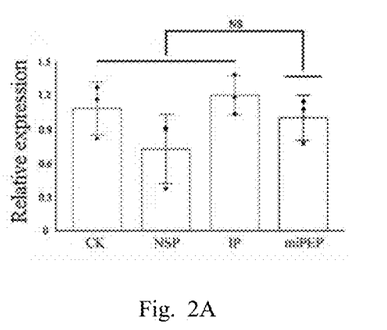
FIG. 2A shows the expression of pri-miR166i in stem explants grown on treated MS for 24 hours. CK: control group without treatment, NSP: non-specific peptide (SEQ ID NO.4), IP: interfering peptide (SEQ ID NO.5), miPEP: peptide encoded by pri-miRNA166i (SEQ ID NO.3).

To investigate the possible role of miPEP166i in its corresponding miRNA biogenesis, RT-qPCR was first used to analyze the abundance changes of pri-miR166i and miR166i in 84K poplar after 24 hours of exogenous treatment. Compared to samples grown in other media under control treatments, we found that the addition of miPEP166i to the growth medium did not result in significant changes in the expression of pri-miR166i (FIG. 2A).

Figure 2B:
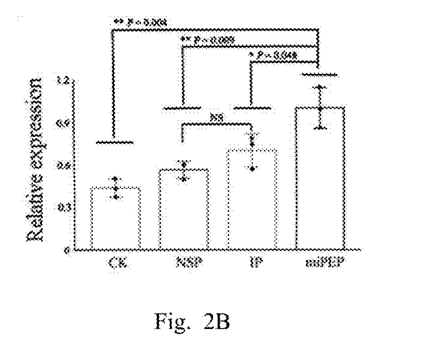
FIG. 2B shows the expression of miR166i in stem explants grown on treated MS for 24 hours. CK: control group without treatment, NSP: non-specific peptide (SEQ ID NO.4), IP: interfering peptide (SEQ ID NO.5), miPEP: peptide encoded by pri-miRNA166i (SEQ ID NO.3).
Figure 2C:
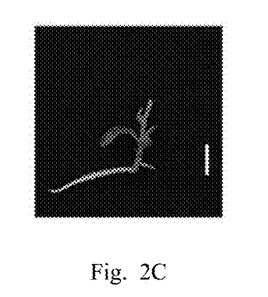
FIG. 2C shows representative images of 2-week-old plants treated with CK, CK: control group without treatment.
Figure 2D:
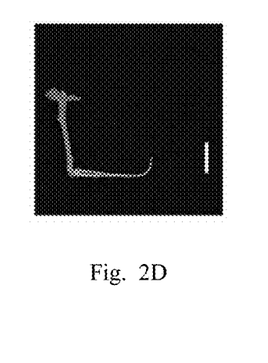
FIG. 2D shows representative images of 2-week-old plants treated with NSP, NSP: non-specific peptide (SEQ ID NO.4).
Figure 2E:
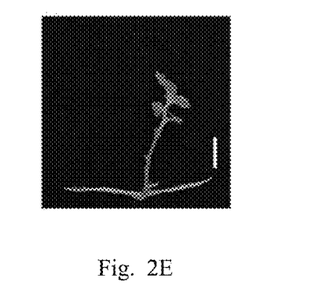
FIG. 2E shows representative images of 2-week-old plants treated with IP, IP: interfering peptide (SEQ ID NO.5).
Figure 2F:
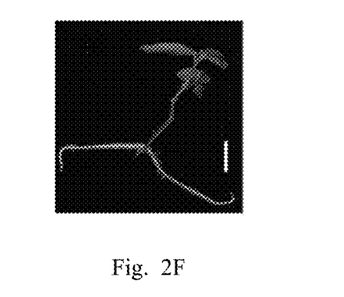
FIG. 2F shows representative images of 2-week-old plants treated with miPEP, miPEP: peptide encoded by pri-miRNA166i (SEQ ID NO.3).
Figure 2G:
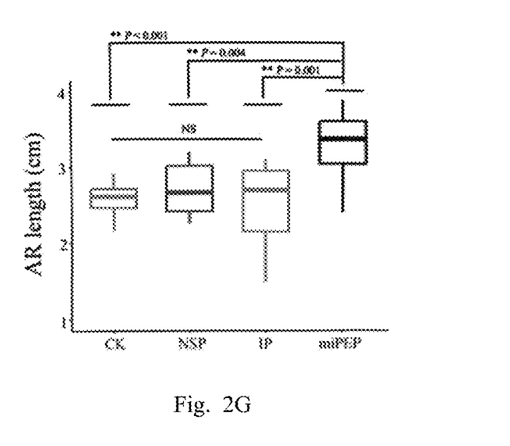
FIG. 2G presents the length of adventitious roots of 2-week-old plants (n=15), with bar graphs representing the mean ±SD. Asterisks (*) indicate significant differences calculated using a two-tailed Student's t-test (defined as *P<0.05, ** P<0.01)). CK: control group without treatment, NSP: non-specific peptide (SEQ ID NO.4), IP: interfering peptide (SEQ ID NO.5), miPEP: peptide encoded by pri-miRNA166i (SEQ ID NO.3).
Figure 2H:
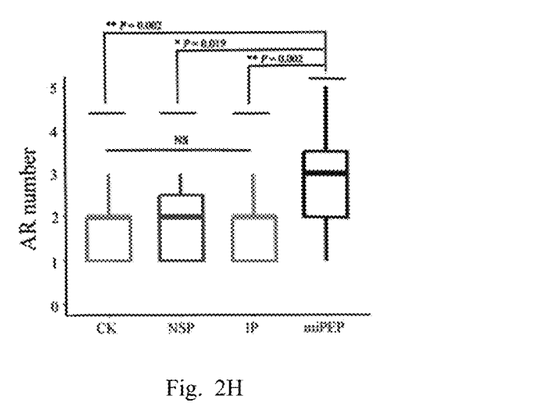
FIG. 2H presents the number of 2-week-old plants (n=15), with bar graphs representing the mean ±SD. Asterisks (*) indicate significant differences calculated using a two-tailed Student's t-test (defined as *P<0.05, **P<0.01)). CK: control group without treatment, NSP: non-specific peptide (SEQ ID NO.4), IP: interfering peptide (SEQ ID NO.5), miPEP: peptide encoded by pri-miRNA166i (SEQ ID NO.3).

However, compared to the three control treatments, the expression of miR166i was significantly enhanced in the miPEP166i samples (FIG. 2B). Although a slightly higher expression of miR166i was observed after IP treatment compared to its expression in NSP samples, the difference was not significant. This may be due to the exogenous peptides acting as biological stimulants and osmotic agents, broadly inducing miRNA expression, with the lowest expression of miR166i observed in the CK samples. Furthermore, observations of plants cultured for two weeks indicated (FIGS. 2C-2F) that the application of synthetic miPEP166i led to a significant increase in the length and number of adventitious roots compared to the three control treatments (FIG. 2G and FIG. 2H). There were no significant differences among the samples of the three control treatments, indicating that miPEP166i can promote the formation and elongation of adventitious roots in 84K poplar in a sequence-specific manner.

2.4. Dynamic Regulatory Pattern Of Exogenous miPEP166i Treatment

Figure 3A:
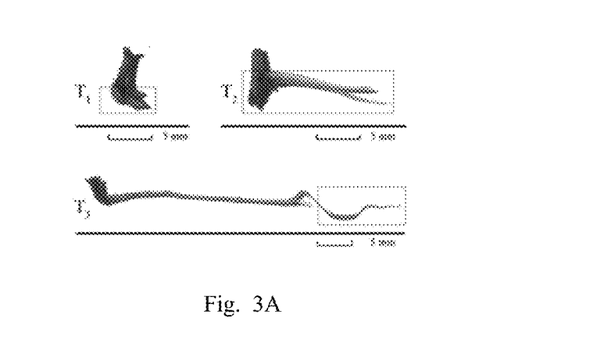
FIG. 3A depicts the collection of root samples at different growth stages, with boxed areas indicating sampling locations: T1, samples from the bottom stem (1-2 mm) with adventitious roots (~5 mm) at the first stage after 6 days of culture (6th DAC, DAC: Days After Culture); T2, samples from the bottom stem with adventitious roots (~1 cm) at the second stage after 9 DAC; and T3, samples from ~1 cm root tips at the third stage after 12 DAC.
Figure 3B:
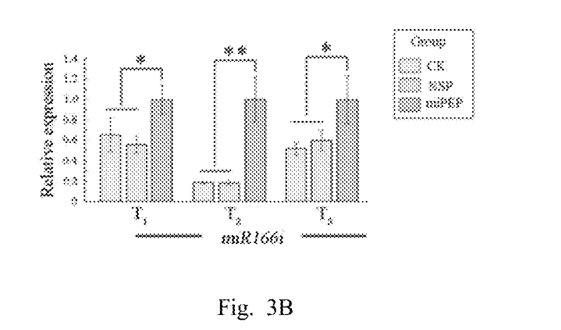
FIG. 3B shows the expression of miR166i in samples at different growth stages, measured by RT-qPCR, with bar graphs representing the mean ±SD (n=3). Asterisks (*) indicate significant differences calculated using a two-tailed Student's t-test (defined as *P<0.05, **P<0.01). T1, samples from the bottom stem (1-2 mm) with adventitious roots (~5 mm) at the first stage after 6 days of culture; T2, samples from the bottom stem with adventitious roots (~1 cm) at the second stage after 9 DAC; and T3, samples from ~1 cm root tips at the third stage after 12 DAC.

During the process of adventitious root elongation, samples collected at 6, 9, and 12 days after cultivation (T1, T2, and T3 stages) were used to detect the expression of miR166i and its targets, aiming to explore the dynamic regulatory pattern of exogenous miPEP166i treatment (FIG. 3A). Due to the equivalence of NSP and IP treatments (FIG. 2G and FIG. 2H), only samples treated with CK, NSP, and miPEP, along with control samples, were used for quantitative miRNA expression and transcriptome sequencing analysis. Compared to the two control treatments, we observed a significant enhancement of miR166i expression in all three stages after miPEP166i treatment (FIG. 3B).

It is known that miR166 primarily targets HD-ZIP III transcription factors, which play crucial roles in promoting cell differentiation and regulating root length. Sixteen genes encoding HD-ZIP III transcription factors were identified in the two subgenomes of 84K poplar, and all of these genes were predicted to be targets of miR166i.

Figure 3C:
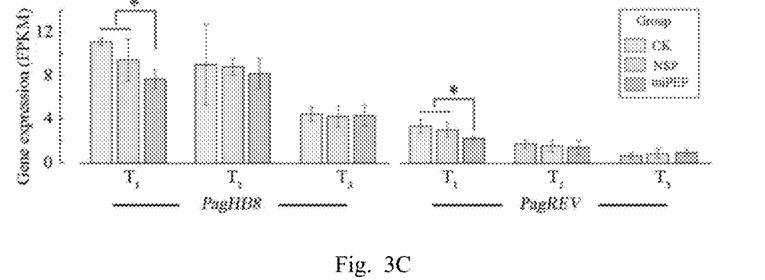
FIG. 3C shows the expression of target genes in samples at different growth stages, measured by RT-qPCR and RNA-seq, respectively, with bar graphs representing the mean ±SD (n=3). Asterisks (*) indicate significant differences calculated using a two-tailed Student's t-test (defined as *P<0.05, **P<0.01). T1, samples from the bottom stem (1-2 mm) with adventitious roots (~5 mm) at the first stage after 6 days of culture; T2, samples from the bottom stem with adventitious roots (~1 cm) at the second stage after 9 DAC; and T3, samples from ~1cm root tips at the third stage after 12 DAC.
Figure 3D:
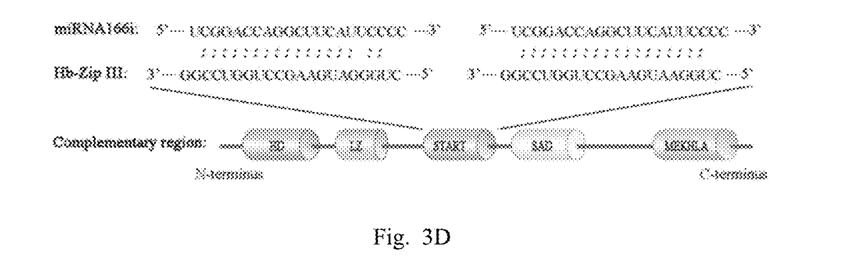
FIG. 3D displays the cleavage sites of miR166i on the complementary sequences of PagHB8 and PagREV genes.)

RNA-seq libraries were constructed from the root systems of 84K poplar to investigate the effects of miPEP166i induction on miR166i targets. Among them, the expression of two target genes (PagHB8 and PagREV, $P<0.05$) was significantly reduced at the T1 stage of miPEP166 treatment (FIG. 3C), and a region of their START domains was almost perfectly complementary to the miR166i sequence (FIG. 3D). However, unlike the sustained effectiveness of miPEP-induced miRNA, no significant reduction in gene expression of PagHB8 and PagREV was observed at the T2 and T3 stages, suggesting that the expression of these two genes is controlled at multiple levels.

2.5. Exploration of Downstream Gene Expression Responses Induced by Exogenous Application of miPEP166i Using time-course transcriptome data from the root systems of 84K poplar, we explored the potential downstream gene expression responses induced by exogenous application of miPEP166i. By cross-comparing miPEP treatment with mock treatment and miPEP treatment with NSP treatment, we identified 114, 130, and 547 differentially expressed genes (DEGs) (|log2FC|>1 and FDR<0.05) at the T1, T2, and T3 stages, respectively. Across all three stages, there were 552 upregulated genes and 139 downregulated genes. In miPEP-treated samples, multiple genes involved in cellulose and lignin biosynthesis, such as PagCSLD4 (Pag_G_013528), PagCAD7 (Pag_G_012180), PagCOBL1 (Pag_G_028682), and PagPAL2 (Pag_G_003126), were upregulated. These genes are controlled by the master switches of HD-ZIP III transcription factors.

Multiple intersections between hormone signaling and HD-ZIP III activity occur during root elongation. Numerous plant hormone-related genes were found within the DEG set, including genes related to auxin and cytokinin synthesis, (De)conjugation, transport, and signaling (Table 1).

We discovered that the mediated cytokinin synthesis gene (PagLOG) was significantly downregulated, while the auxin synthesis gene (PagTAA1) was significantly upregulated in miPEP-treated samples. The expression of PagCKI1 and PagGH3 genes, involved in cytokinin signaling and auxin conjugation, was also upregulated and downregulated, respectively. Strikingly, the expression of multiple genes encoding auxin transport proteins, such as PIN-FORMED (PIN), ATP-binding cassette family B (ABCB), and PIN-LIKES auxin transport proteins, was significantly increased at the T3 stage. These proteins can direct auxin transport from the root tip to the root elongation zone, determining root elongation.

TABLE 1

Genes in Hormone Metabolism and Signaling Pathways Induced or Repressed by miPEP166i

| Gene ID | Symbol | Gene function annotation | $FC\_T_1$ miPEP/CK | $FC\_T_1$ miPEP/NSP | $FC\_T_2$ miPEP/CK | $FC\_T_2$ miPEP/NSP | $FC\_T_3$ miPEP/CK | $FC\_T_3$ miPEP/NSP |
|---|---|---|---|---|---|---|---|---|
| Auxin-regulated genes | | | | | | | | |
| Pag_G_015269 | GH3.10 | Indole-3-acetic acid-amido synthetase | −1.67** | −1.21* | — | — | — | — |
| Pag_A_034334 | | | −2.92* | −2.2 | — | — | — | — |
| Pag_G_025244 | | | −4.42* | −3.64 | — | — | — | — |
| Pag_G_024492 | ABCB9 | ABC transporter B family member 9 | −1.07* | −0.72 | — | — | — | — |
| Pag_G_035628 | TAA1 | | — | — | 0.74 | 1.72* | — | — |
| Pag_G_035629 | | L-tryptophan--pyruvate aminotransferase | — | — | 0.78 | 1.49** | — | — |
| Pag_A_005381 | ABCB11 | ABC transporter B family member 11 | — | — | — | — | 2.40** | 1.34** |
| Pag_A_010928 | | | — | — | — | — | 1.90** | 1.13* |
| Pag_G_007723 | | | — | — | — | — | 2.08** | 1.34* |
| Pag_A_017535 | ABCB15 | ABC transporter B family member 15 | — | — | — | — | 1.05** | 1.11** |
| Pag_G_028009 | | | — | — | — | — | 1.21** | 1.27** |
| Pag_A_009324 | ABCB25 | ABC transporter B family member 25 | — | — | — | — | 1.18 | 3.26* |
| Pag_A_020924 | ABCB8 | ABC transporter B family member 8 | — | — | — | — | −1.18** | −0.71 |
| Pag_A_012930 | PILS3 | Protein PIN-LIKES 3 | — | — | — | — | 4.74* | −2.93 |
| Pag_G_005929 | PILS7 | Protein PIN-LIKES 7 | — | — | — | — | 0.96** | 1.03** |
| Pag_A_015236 | PIN7 | Auxin efflux carrier component 7 | — | — | — | — | 1.33** | 1.08** |
| Pag_A_008558 | PIN8 | Auxin efflux carrier component 8 | — | — | — | — | −1.07* | −0.94 |
| Pag_G_019315 | | | — | — | — | — | 1.02** | 1.16** |
| Pag_G_003815 | ARF11 | Auxin response factor 11 | — | — | — | — | −1.75** | −1.14* |
| Pag_G_007396 | IAA29 | Auxin-responsive protein 29 | — | — | — | — | −0.94* | −1.21** |
| Cytokinin-regulated genes | | | | | | | | |
| Pag_A_037490 | CKX3 | Cytokinin dehydrogenase 3 | 4.85* | 2.61 | — | — | — | — |
| Pag_G_021773 | LOG5 | Cytokinin riboside 5'-monophosphate phosphoribohydrolase 5 | −1.91* | −2.14* | — | — | — | — |
| Pag_A_024550 | CKI1 | Histidine kinase 1 | — | — | 1.02** | 1.11** | — | — |
| Pag_G_014127 | | | — | — | 0.93* | 1.14** | — | — |
| Pag_G_016517 | CKX1 | Cytokinin dehydrogenase 1 | — | — | −1.17 | −2.19** | — | — |
| Pag_A_016041 | LOG1 | Cytokinin riboside 5'-monophosphate phosphoribohydrolase 1 | — | — | — | — | −2.72** | −2.28* |
| Pag_G_010191 | LOG3 | Cytokinin riboside 5'-monophosphate phosphoribohydrolase 3 | — | — | — | — | −1.55 | −1.86* |

3. Conclusion

Through a comprehensive peptidomics workflow, the present disclosure systematically identifies miPEPs within three tissues of 84K poplar and further translates the sequence found within the primary transcript of miRNA166i to obtain the root-specifically expressed miPEP166i. Upon verification, exogenous use of miPEP166i promotes the formation and elongation of adventitious roots in 84K poplar in a sequence-specific manner. The comprehensive annotation and functional analysis of miPEPs in 84K poplar presented in the present disclosure provide valuable genetic resources for their use in poplar and other forest trees.

The above-mentioned embodiments merely represent several embodiments of the present disclosure, and their descriptions are relatively specific and detailed, but they should not be construed as limiting the scope of the present disclosure. It should be noted that, for those of ordinary skill in the art, several modifications and improvements can be made without departing from the concept of the present disclosure, and these all belong to the protection scope of the present disclosure.

What is claimed is:

1. A synthetic microRNA-encoded peptide 166i (miPEP166i), wherein the amino acid sequence of the synthetic peptide miPEP166i is SEQ ID NO.3.

2. The synthetic peptide miPEP166i according to claim 1, wherein the synthetic peptide miPEP166i is obtained by translating from the 236th to the 307th position of a primary transcript sequence of microRNA 166i (miRNA166i), and the primary transcript sequence of the miRNA166i is SEQ ID NO.2.

3. A method of promoting formation and elongation of adventitious roots in *Populus alba×Populus tremula* var. *glandulosa* (84K polar) during cell culture of the 84K polar, comprising adding the small synthetic peptide miPEP166i according to claim 1 to a growth medium during the tissue culture of the 84K poplar.

4. The method according to claim 3, wherein the concentration of the synthetic peptide miPEP166i is 5 μM.

5. The method according to claim 3, wherein the synthetic peptide miPEP166i promotes the formation and elongation of adventitious roots in the 84K poplar by enhancing the expression of the miR166i or reducing the expression of target genes of the miR166i.

* * * * *